(12) United States Patent  (10) Patent No.: US 8,834,620 B2
Baettig et al.  (45) Date of Patent: Sep. 16, 2014

(54) BLACK DISAZO DYES, THEIR PREPARATION AND USE

(75) Inventors: Kurt Baettig, Le Mouret (CH);
Jean-Luc Gremaud, Farvagny (CH);
Damien Moigno, Marly (CH)

(73) Assignee: Ilford Imaging Switzerland GmbH (CH)

( * ) Notice: Subject to any disclaimer, the term of this patent is extended or adjusted under 35 U.S.C. 154(b) by 120 days.

(21) Appl. No.: 13/274,741

(22) Filed: Oct. 17, 2011

(65) Prior Publication Data

US 2012/0090503 A1  Apr. 19, 2012

(30) Foreign Application Priority Data

Oct. 16, 2010 (EP) ...................................... 10187827

(51) Int. Cl.
C09D 11/02 (2014.01)
C09B 31/02 (2006.01)
C09B 31/12 (2006.01)
C09D 11/328 (2014.01)

(52) U.S. Cl.
CPC ............ C09B 31/025 (2013.01); C09D 11/328 (2013.01); C09B 31/12 (2013.01)
USPC .......................... 106/31.52; 534/579; 534/827

(58) Field of Classification Search
USPC ........ 106/31.52; 534/579, 827, 828; 427/256; 428/195.1
See application file for complete search history.

(56) References Cited

U.S. PATENT DOCUMENTS 3,923,778 A * 12/1975 de Montmollin et al. .... 534/827
(Continued)

FOREIGN PATENT DOCUMENTS

CN 101362864 A 2/2009
DE 19523245 1/1997
(Continued)

OTHER PUBLICATIONS

Dyes and Pigments, 1993, vol. 22, No. 2, pp. 99-116.

*Primary Examiner* — Helene Klemanski
(74) *Attorney, Agent, or Firm* — Onofrio Law; Dara L. Onofrio, Esq.

(57) ABSTRACT

Black disazo dyes of general formula (V)

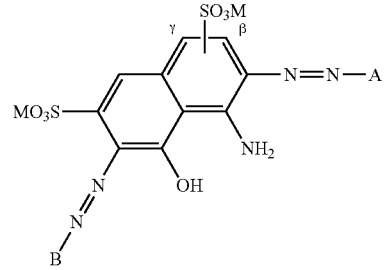

(V)

wherein
A is a moiety of formula (VI)

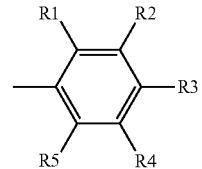

(VI)

or of formula (VII)

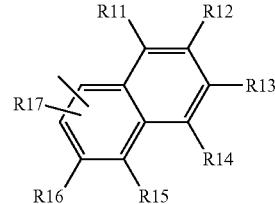

(VII)

and
B is a moiety of formula (VII)

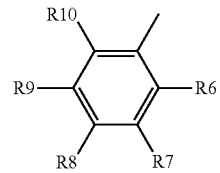

(VIII)

or of formula (IX)

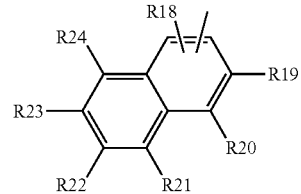

(IX)

and wherein M, $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, $R_{23}$ and $R_{24}$, are as defined in the specification, are excellent black dyes for dying and printing cellulose containing materials and textile materials and, in particular, for preparation of recording liquids for ink jet printing and for writing utensils.

11 Claims, No Drawings

(56) References Cited

U.S. PATENT DOCUMENTS

| | | | |
|---|---|---|---|
| 4,257,770 A | 3/1981 | Nishimura et al. | |
| 4,365,998 A | 12/1982 | Sugiyama et al. | |
| 4,371,582 A | 2/1983 | Sugiyama et al. | |
| 4,638,054 A | 1/1987 | Herd et al. | |
| 5,358,558 A | 10/1994 | Yamamoto et al. | |
| 5,748,208 A | 5/1998 | Uchiyama et al. | |
| 5,935,309 A | 8/1999 | Moffatt et al. | |
| 6,171,349 B1* | 1/2001 | Lai et al. | 8/549 |
| 6,359,121 B1* | 3/2002 | Ebenezer et al. | 534/634 |
| 7,288,142 B2* | 10/2007 | Lin et al. | 106/31.52 |
| 7,387,667 B1* | 6/2008 | Lin et al. | 106/31.52 |
| 7,438,753 B2* | 10/2008 | Lin et al. | 106/31.52 |
| 7,524,368 B2* | 4/2009 | Lee et al. | 106/31.52 |
| 8,465,577 B2* | 6/2013 | Chen et al. | 106/31.52 |
| 2002/0121219 A1 | 9/2002 | Stramel et al. | |
| 2006/0174800 A1 | 8/2006 | Lin et al. | |
| 2007/0050926 A1 | 3/2007 | Lin et al. | |
| 2007/0227388 A1 | 10/2007 | Ohno et al. | |
| 2008/0292792 A1* | 11/2008 | Matsui et al. | 427/256 |
| 2009/0118479 A1* | 5/2009 | Ohno et al. | 427/256 |
| 2011/0308425 A1* | 12/2011 | Chen et al. | 106/31.52 |

FOREIGN PATENT DOCUMENTS

| | | |
|---|---|---|
| EP | 0133283 | 7/1984 |
| EP | 0885940 | 12/1998 |
| EP | 1734081 | 12/2006 |
| EP | 1889882 | 2/2008 |
| WO | WO 9324330 | 12/1992 |
| WO | WO 0008104 | 2/2000 |

* cited by examiner

BLACK DISAZO DYES, THEIR PREPARATION AND USE

FIELD OF THE INVENTION

The invention relates to novel black disazo dyes, their salts, a method of their preparation and their use in dying and printing operations. It relates also to liquid dye preparations containing these dyes, in particular to aqueous recording fluids for ink jet printing and for writing utensils.

BACKGROUND OF THE INVENTION

Ink jet printing processes are essentially of two types:

In continuous stream ink jet printing systems, a recording liquid is emitted in a continuous stream under pressure through a nozzle. The stream breaks up into individual droplets at a certain distance from the nozzle. If a specific location on the recording sheet has to be printed the individual droplets are directed to the recording sheet, otherwise they are directed to a collecting vessel. This is done for example by charging unnecessary droplets in accordance with digital data signals and passing them through an electrostatic field which adjusts the trajectory of these droplets in order to direct them to the collecting vessel. The inverse procedure may also be used wherein uncharged droplets end up in the collecting vessel.

In the non-continuous process, or the so-called "drop-on-demand" systems, droplets are generated in accordance with digital data signals only if a specific location on the recording sheet has to be printed.

The speed of modern ink jet printers has to increase steadily increasing for economic reasons. Digital images, captured with digital cameras or generated by scanning of silver halide camera films, may be printed with these modern printers at a quality level that makes these images nearly indistinguishable from classical copies on silver halide materials. Images produced in this way need to have excellent storage stability even under adverse conditions. This can only be achieved by using a finely tuned system of recording liquids (respectively the dyes contained therein) together with a suitable recording sheet.

Recording sheets suitable for these printers need to absorb the recording liquids very rapidly, in particular during the printing of photo realistic images. Recording sheets particularly suitable for this purpose comprise nanoporous inorganic compounds, preferably oxides, such as aluminum oxides or silicon dioxide, or oxide/hydroxides, such as aluminum oxide/hydroxides. These recording sheets are known as "nanoporous" recording sheets.

Nanoporous recording sheets absorb the recording liquids very rapidly (in the microsecond range) by the action of the capillary forces of the nanoporous compounds. Polymer based recording sheets absorb the recording liquids more slowly (in the millisecond range) by swelling of the polymer.

Most of the commercially available combinations of recording liquids and nanoporous recording sheets do not satisfy all the necessary requirements. The black dyes used nowadays do not have all required properties, such as very high brilliance (saturation), a suitable hue, good light stability, good resistance against degradation by ozone, an excellent diffusion fastness. They have to penetrate into the recording sheet and should not show dye aggregation on the surface of the recording sheet ("bronzing") and they need to have an excellent solubility in the mainly aqueous recording liquid.

C.I. Direct Black 168 of formula (I)

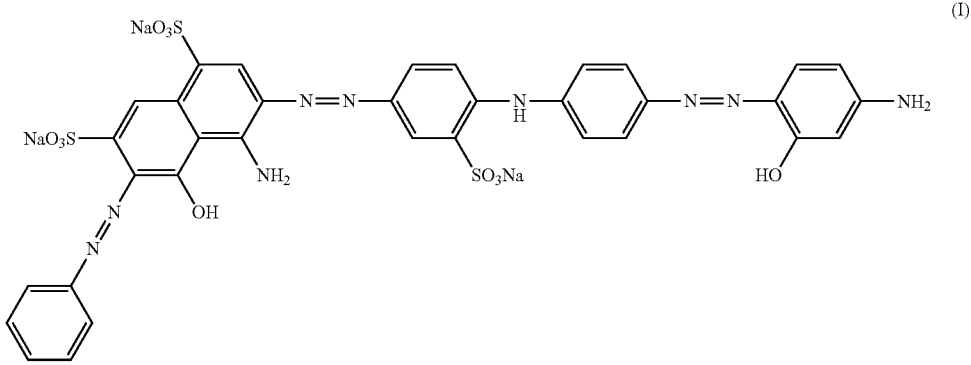

(I)

is a widely used, commercially available black dye.

Recording fluids for ink jet printing containing C.I. Direct Black 168 are described in patent applications WO93/24,330, EP 0,885,940 and US 2002/0,121,219. However, if used for dyeing paper or in recording fluids for ink jet printing, it is not soluble enough and it gives recorded images having insufficient water-durability, showing bronzing and a non-neutral hue on nanoporous media. It causes clogging of nozzles of the printing head due to deposition of dye. Direct Black 168 has to be used in a mixture with pacified C.I. Reactive Black 31 in order to provide blacks with a neutral hue.

C.I. Reactive Black 5 of formula (II)

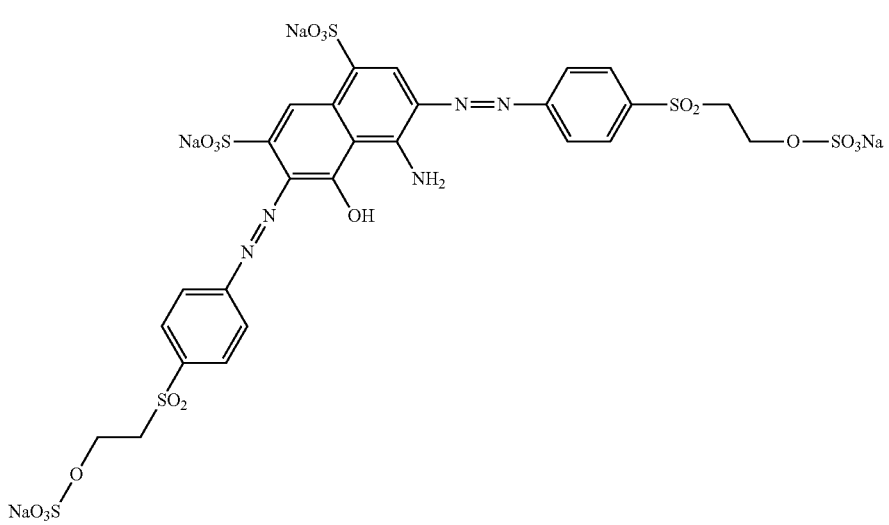

is also a widely used, commercially available black dye.

Recording fluids for ink jet printing containing C.I. Reactive Black 5 are described in U.S. Pat. Nos. 4,257,770, 5,358,558, 5,935,309 and in patent application US 2006/0,174,800. The tint of blacks in recorded images, however, is more bluish than black.

C.I. Acid Black 1 of formula (III)

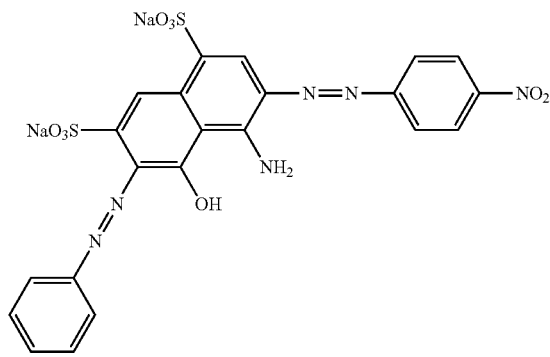

is also a widely used, commercially available black dye.

Recording fluids for ink jet printing containing C.I. Acid Black 1 are described in U.S. Pat. No. 4,365,998 and 4,371,582.

The light fastness of this dye, however, is very poor on plain paper and on polymer based recording sheets for ink jet printing. The light stability on porous media is somewhat better, however, it is still far away from the request of today's market. This dye also has a bluish hue and cannot be used alone as a black dye in recording liquids for ink jet printing.

The black dye of formula (IV)

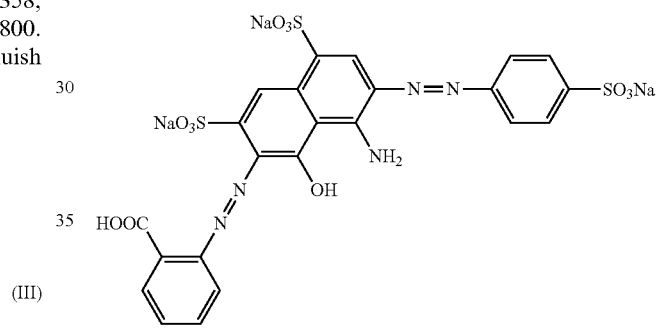

is described in patent application US 2007/0,050,926 as being particularly suitable as a light-fast component in a black recording fluid for ink jet printing. However, its resistance against degradation by ozone is bad.

There is therefore an urgent need to provide novel, highly water-soluble black dyes with a neutral hue, excellent light stability, excellent water fastness, no bleeding, excellent resistance against degradation by ozone and a neutral hue even after degradation by light or ozone.

DESCRIPTION OF THE INVENTION

The present invention refers to novel black disazo dyes of general formula (V)

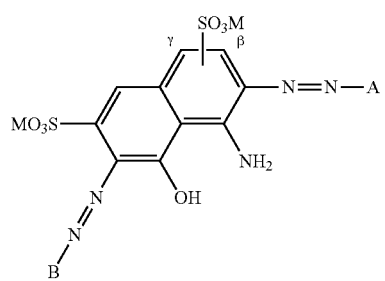

wherein
M represents a hydrogen atom, a sodium atom, a potassium atom, a lithium atom, an ammonium cation or an aliphatic ammonium cation with 4 identical substituents having from 1 to 4 carbon atoms,
A is a moiety of formula (VI)

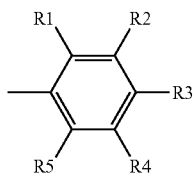

(VI)

wherein
  $R_1$ represents a hydrogen atom, a halogen atom, a sulfonic acid group or a nitro group;
  $R_2$ represents a hydrogen atom, a carboxylic acid group, a sulfonic acid group, a hydroxy group or a nitro group;
  $R_3$ represents a hydrogen atom, a halogen atom, a nitrile group, a carboxylic acid group, a sulfonic acid group, a nitro group, an alkyl group having 1 to 4 carbon atoms, an alkyl group having 1 to 4 carbon atoms substituted by 1 to 3 halogen atoms, an ester group having 1 to 4 carbon atoms, an alkoxyl group having 1 to 4 carbon atoms, an unsubstituted or substituted heterocyclic group, a sulfonamide group, a sulfonyl group, a sulfoester group having 1 to 4 carbon atoms or an alkylamido group having 1 to 4 carbon atoms;
  $R_4$ represents a hydrogen atom, a halogen atom, a carboxylic acid group, a sulfonic acid group, a nitro group, an amino group, an alkyl group having 1 to 4 carbon atoms, an alkoxyl group having 1 to 4 carbon atoms, a sulfonamide group, a sulfonyl group, a sulfoester group having 1 to 4 carbon atoms or an alkylamido group having 1 to 4 carbon atoms;
  $R_5$ represents a hydrogen atom, a halogen atom, a nitrile group, a sulfonic acid group, a nitro group, a hydroxy group, an alkyl group having 1 to 4 carbon atoms or an alkylamido group having 1 to 4 carbon atoms;
or
a moiety of formula (VII)

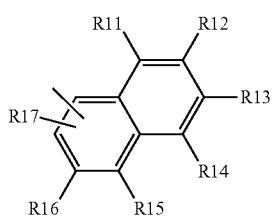

(VII)

wherein
  $R_{11}$ represents a hydrogen atom or a sulfonic acid group;
  $R_{12}$ represents a hydrogen atom or a sulfonic acid group;
  $R_{13}$ represents a hydrogen atom or a sulfonic acid group;
  $R_{14}$ represents a hydrogen atom, a hydroxy group or a sulfonic acid group;
  $R_{15}$ represents a hydrogen atom or a sulfonic acid group;
  $R_{16}$ represents a hydrogen atom or a sulfonic acid group;
  $R_{17}$ represents a sulfonic acid group;

B is a moiety of formula (VIII)

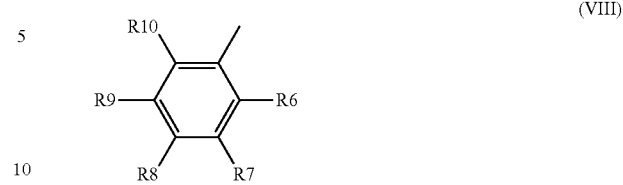

(VIII)

wherein
  $R_6$ represents a hydrogen atom, a halogen atom, a sulfonic acid group or a nitro group;
  $R_7$ represents a hydrogen atom, a carboxylic acid group, a sulfonic acid group, a hydroxy group or a nitro group;
  $R_8$ represents a hydrogen atom, a halogen atom, a nitrile group, a carboxylic acid group, a sulfonic acid group, a nitro group, an alkyl group having 1 to 4 carbon atoms, an alkyl group having 1 to 4 carbon atoms substituted by 1 to 3 halogen atoms, an ester group having 1 to 4 carbon atoms, an alkoxyl group having 1 to 4 carbon atoms, an unsubstituted or substituted heterocyclic group, a sulfonamide group, a sulfonyl group, a sulfoester group having 1 to 4 carbon atoms or an alkylamido group having 1 to 4 carbon atoms;
  $R_9$ represents a hydrogen atom, a halogen atom, a carboxylic acid group, a sulfonic acid group, a nitro group, an amino group, an alkyl group having 1 to 4 carbon atoms, an alkoxyl group having 1 to 4 carbon atoms, a sulfonamide group, a sulfonyl group, a sulfoester group having 1 to 4 carbon atoms or an alkylamido group having 1 to 4 carbon atoms;
  $R_{10}$ represents a hydrogen atom, a halogen atom, a nitrile group, a sulfonic acid group, a nitro group, a hydroxy group, an alkyl group having 1 to 4 carbon atoms or an alkylamido group having 1 to 4 carbon atoms;
or
a moiety of formula (IX)

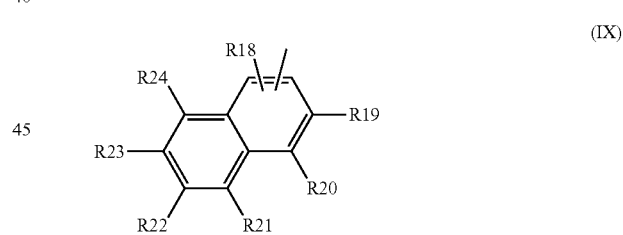

(IX)

wherein
  $R_{18}$ represents a sulfonic acid group;
  $R_{19}$ represents a hydrogen atom or a sulfonic acid group;
  $R_{20}$ represents a hydrogen atom or a sulfonic acid group;
  $R_{21}$ represents a hydrogen atom, a hydroxy group or a sulfonic acid group;
  $R_{22}$ represents a hydrogen atom or a sulfonic acid group;
  $R_{23}$ represents a hydrogen atom or a sulfonic acid group;
  $R_{24}$ represents a hydrogen atom or sulfonic acid group
and
B has at least one sulfonic acid group or at least two carboxylic acid groups.
Preferred are disazo dyes of general formula (V)
wherein M, $R_{17}$ and $R_{18}$ are as defined before,
  $R_1$ represents a hydrogen atom, a halogen atom or a sulfonic acid group;
  $R_2$ represents a hydrogen atom or a carboxylic acid group;

$R_3$ represents a hydrogen atom, a nitro group or a sulfonic acid group;
$R_4$ represents a hydrogen atom, a halogen atom, a sulfonic acid group. a carboxylic acid group, a nitro group, an amino group or an alkylamido group having 1 to 4 carbon atoms;
$R_5$ represents a hydrogen atom, a nitrile group or a sulfonic acid group;
$R_6$ represents a hydrogen atom, a nitro group or a sulfonic acid group;
$R_7$ represents a hydrogen atom or a carboxylic acid group;
$R_8$ represents a hydrogen atom, a sulfonic acid group or a nitro group;
$R_9$ represents a hydrogen atom, a sulfonic acid group, a carboxylic acid group or an alkyl group having 1 to 4 carbon atoms;
$R_{10}$ represents a hydrogen atom or a sulfonic acid group;
$R_{11}$ represents a hydrogen atom;
$R_{12}$ represents a hydrogen atom;
$R_{13}$ represents a hydrogen atom;
$R_{14}$ represents a sulfonic acid group;
$R_{15}$ represents a hydrogen atom;
$R_{16}$ represents a hydrogen atom;
$R_{19}$ represents a hydrogen atom;
$R_{20}$ represents a hydrogen atom;
$R_{21}$ represents sulfonic acid group;
$R_{22}$ represents a hydrogen atom;
$R_{23}$ represents a hydrogen atom
and
$R_{24}$ represents a hydrogen atom.

More preferred are disazo dyes of general formula (V) wherein M, $R_2$, $R_{11}$, $R_{12}$, $R_{13}$, $R_{14}$, $R_{15}$, $R_{16}$, $R_{17}$, $R_{18}$, $R_{19}$, $R_{20}$, $R_{21}$, $R_{22}$, $R_{23}$ and $R_{24}$ are as defined before,
$R_1$ represents a hydrogen atom or a sulfonic acid group;
$R_3$ represents a hydrogen atom or a sulfonic acid group;
$R_4$ represents a hydrogen atom, a sulfonic acid group or a carboxylic acid group;
$R_5$ represents a hydrogen atom or a sulfonic acid group;
$R_6$ represents a hydrogen atom or a sulfonic acid group;
$R_7$ represents 6 hydrogen atom;
$R_8$ represents a hydrogen atom or a nitro group;
$R_9$ represents a hydrogen atom, a sulfonic acid group or an alkyl group having 1 to 4 carbon atoms
and
$R_{10}$ represents a hydrogen atom.

Preferred are dyes of general formula (V), wherein $R_{17}$ is in meta position to $R_{16}$ and $R_{18}$ is in meta position to $R_{19}$.

Particularly preferred are dyes of general formula (V), wherein the sulfo group is in position γ.

The invention does not only relate to pure black dyes of general formula (V), but also to mixtures of these dyes.

The invention also relates to a method of preparation of the dyes of general formula (V) according to the invention, wherein, in a first step,
an amine of general formula (XII)

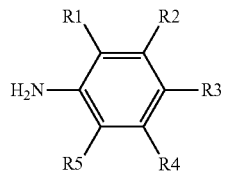
(XII)

wherein $R_1$, $R_2$, $R_3$, $R_4$, and $R_5$ are as defined before, or of general formula (XIII)

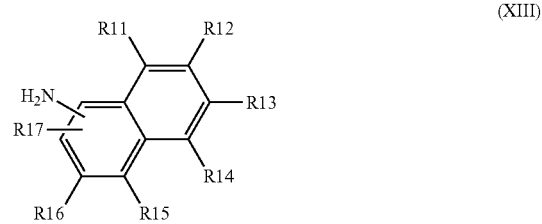
(XIII)

wherein $R_{11}$, $R_{12}$, $R_{13}$, $R_{14}$, $R_{15}$, $R_{16}$ and $R_{17}$ are as defined before,
is diazotized in an aqueous inorganic acid medium at a temperature between −5° C. and 15° C. and coupled with the compound of formula (XIV)

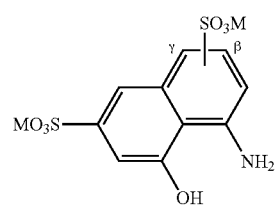
(XIV)

at an acidic to weakly acidic value of pH,
and,
in a second step,
an amine of general formula (XV)

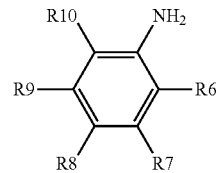
(XV)

wherein $R_6$, $R_7$, $R_8$, $R_9$ and $R_{10}$ are as defined before,
or of general formula (XVI)

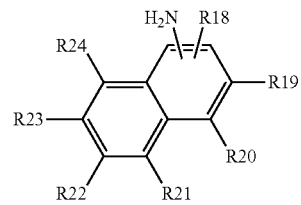
(XVI)

wherein $R_{18}$, $R_{19}$, $R_{20}$, $R_{21}$, $R_{22}$, $R_{23}$ and $R_{24}$ are as defined before,
is diazotized in an inorganic acid medium at a temperature between −5° C. and 15° C. and coupled with the reaction product of step 1 at a weakly basic to basic value of pH.

An acidic to weakly acidic value of pH means a value of pH situated between 1 and 4.

A weakly basic to basic value of pH means a value of pH situated between 8 and 10.

The compound of formula (XIV), wherein the sulfo group is in position γ, is also known as K acid (4-amino-5-hydroxynaphthalene-1,7-disulfonic acid).
The compound of formula (XIV), wherein the sulfo group is in position β, is also known as H acid (4-amino-5-hydroxynaphthalene-2,7-disulfonic acid).
The following amines of general formulas (XII) or (XV) are commercially available:
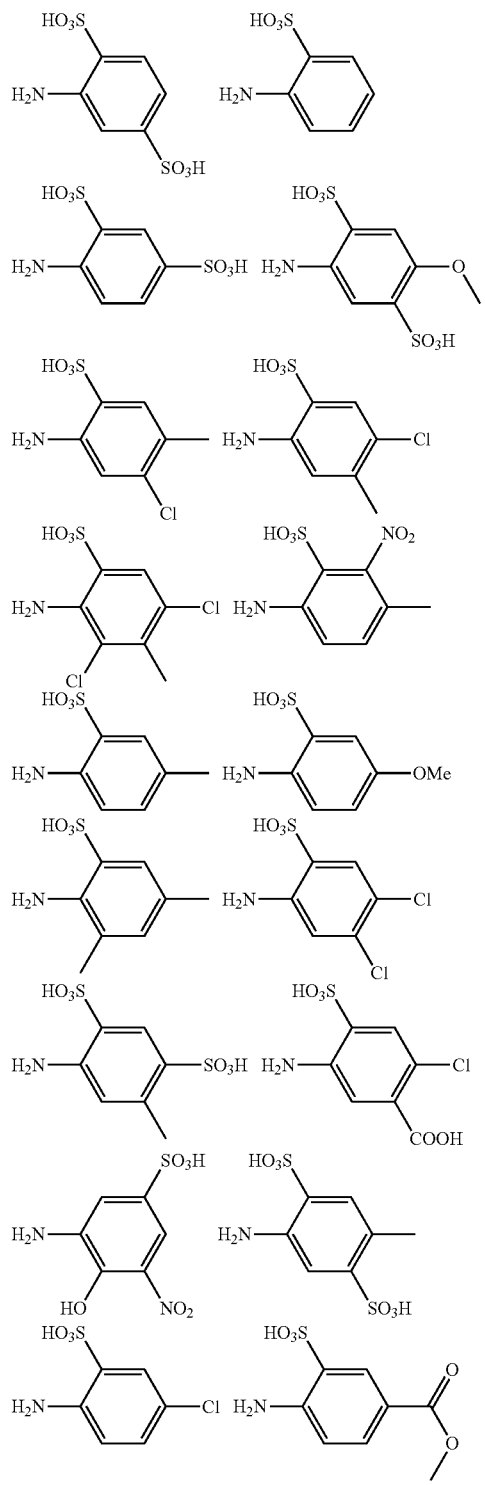
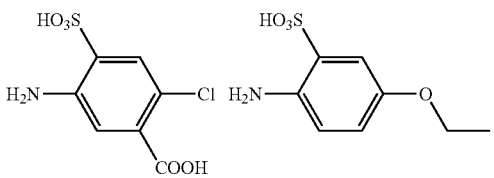
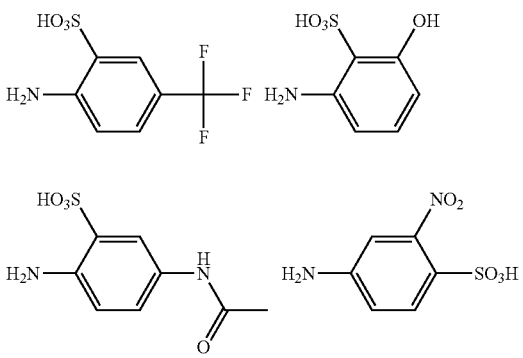
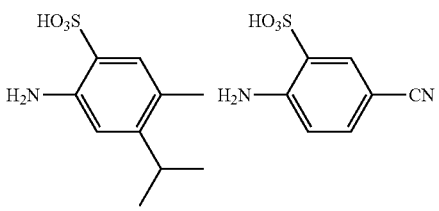
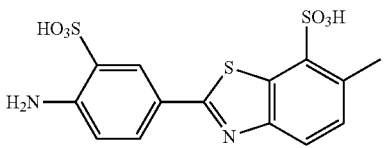
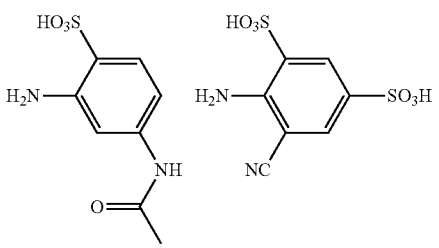
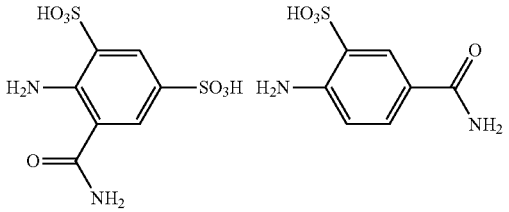
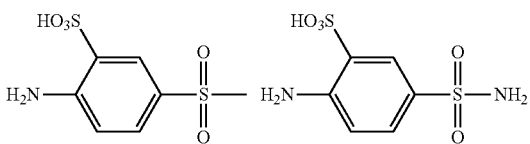

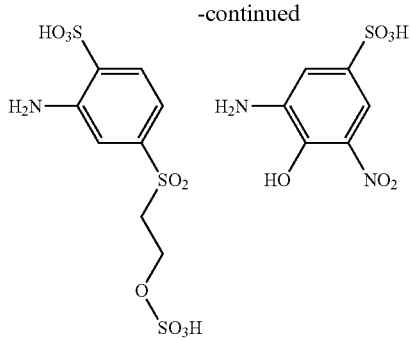
The following amines of general formulas (XIII) or (XVI) are commercially available:
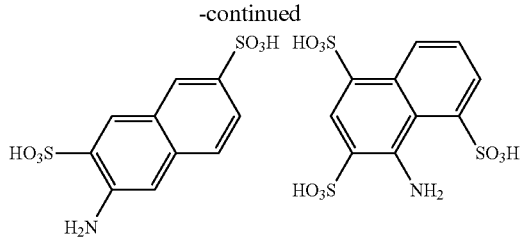
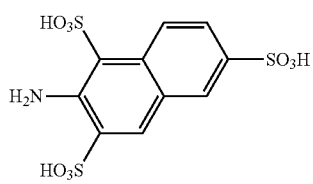
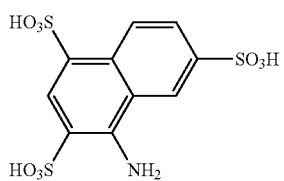
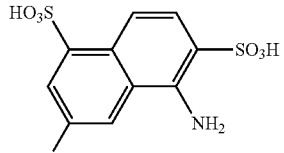
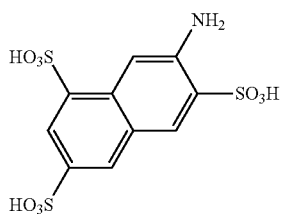
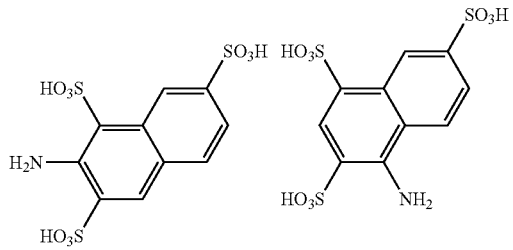
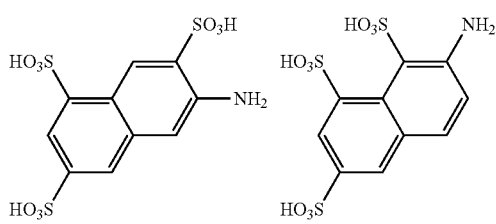
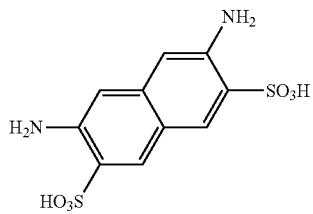

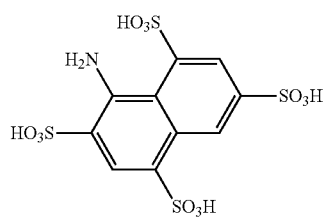
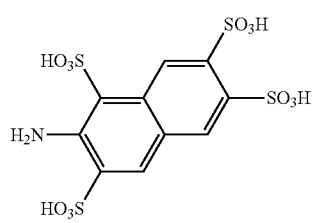
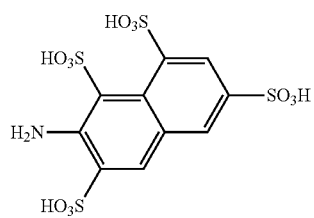
The following dyes according to the invention have been prepared in the form of their sodium salts:
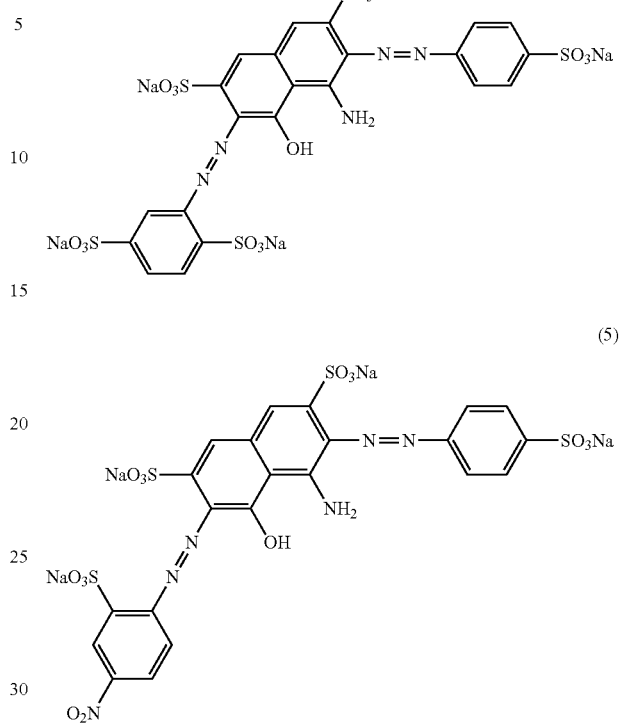
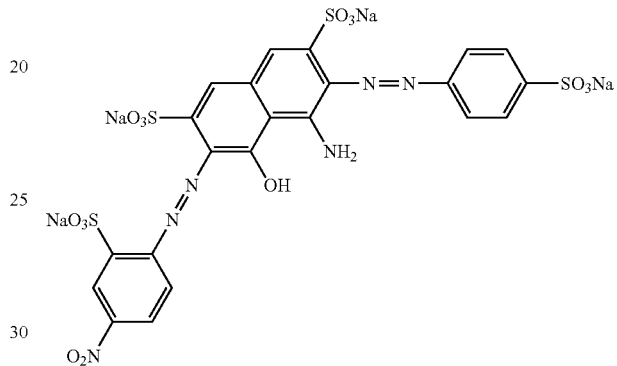
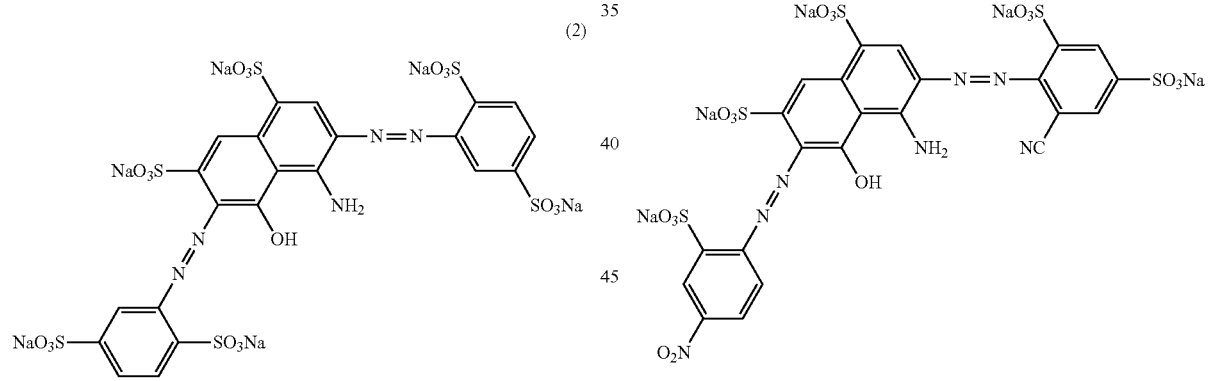
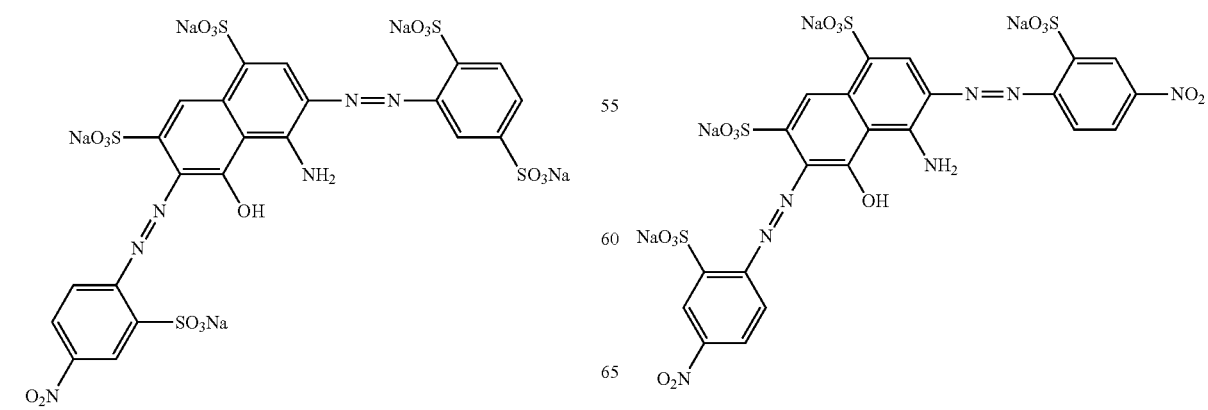

-continued
(8)
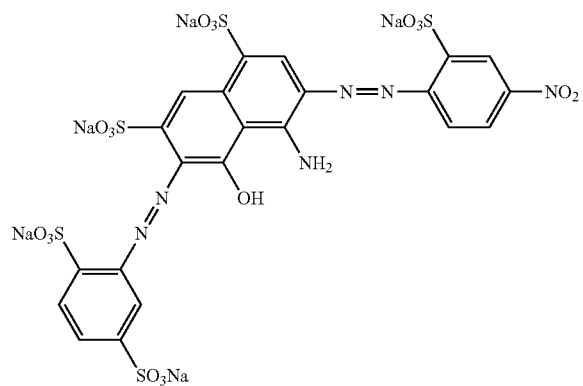
(9)
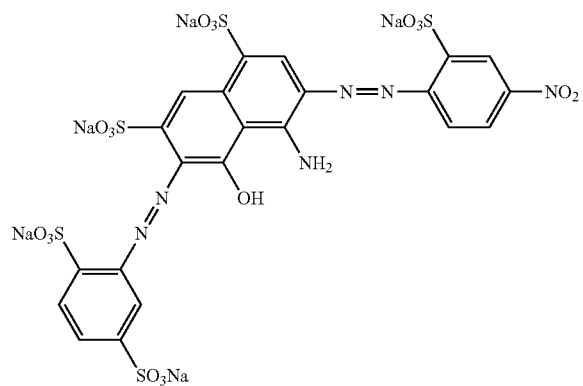
(10)
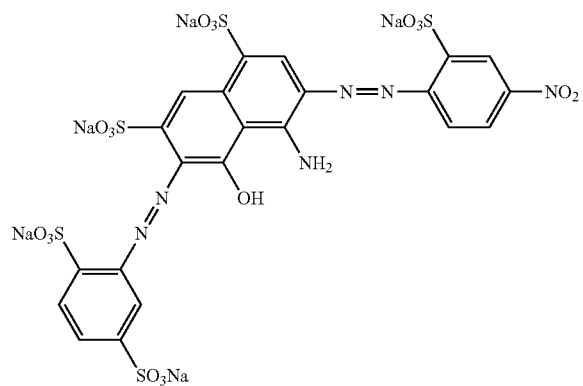
(11)
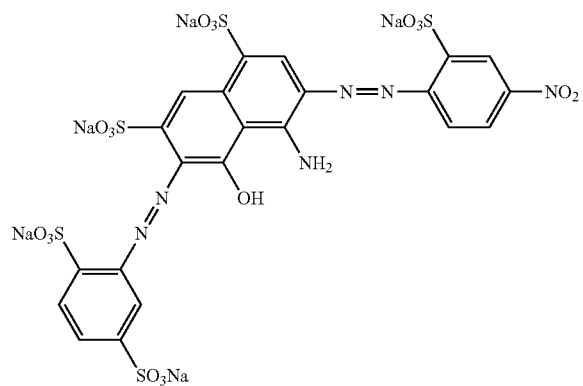
-continued
(12)
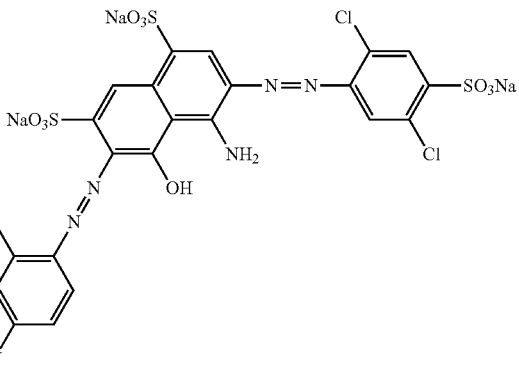
(13)
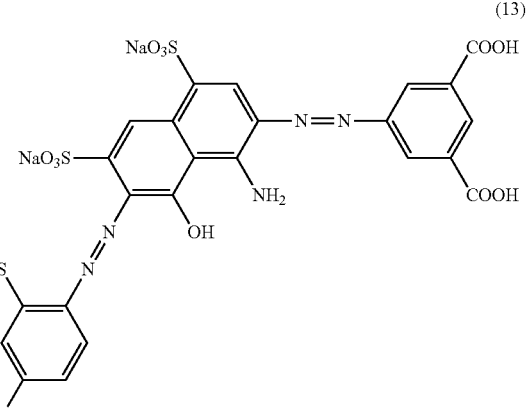
(14)
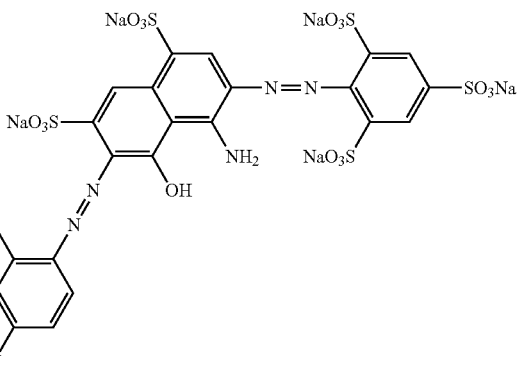
(15)
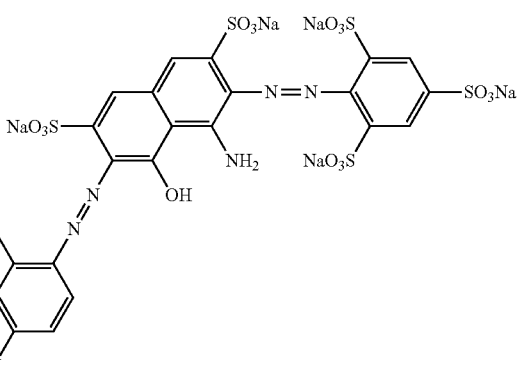

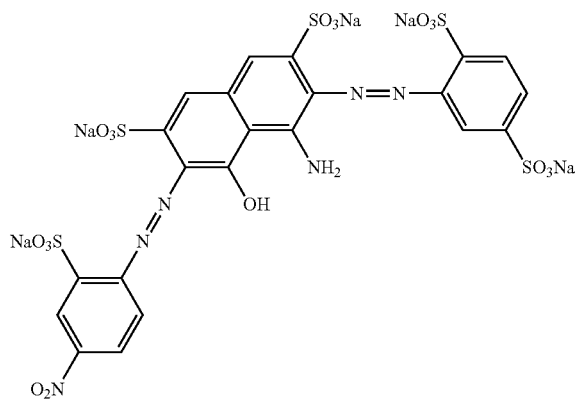
(16)
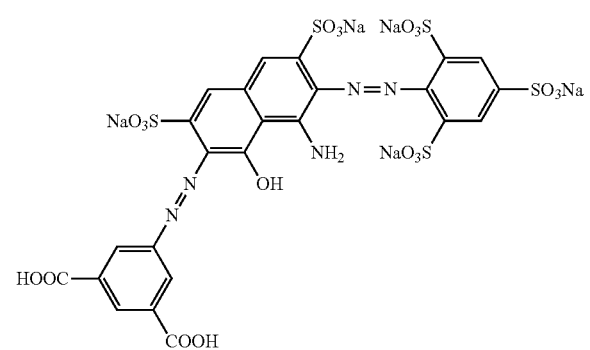
(20)
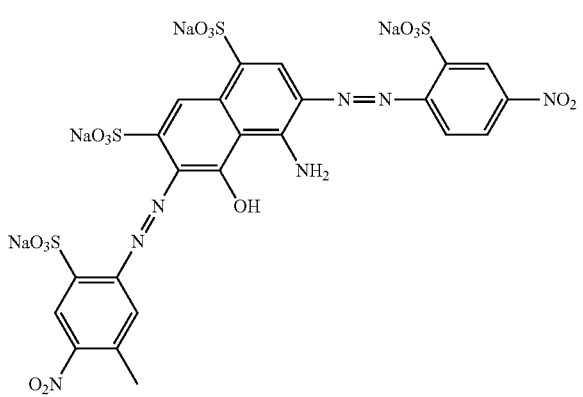
(17)
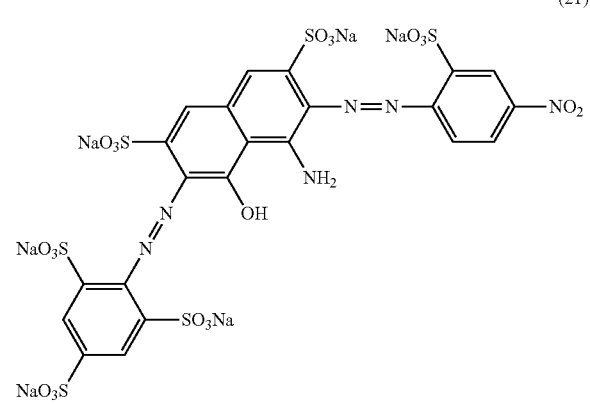
(21)
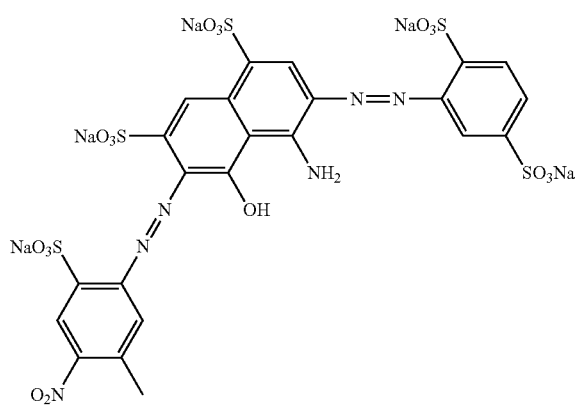
(18)
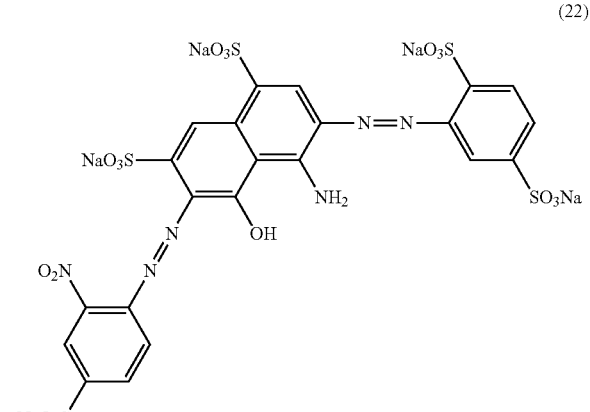
(22)
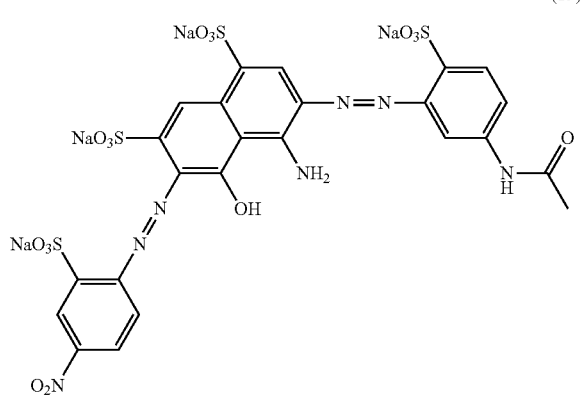
(19)
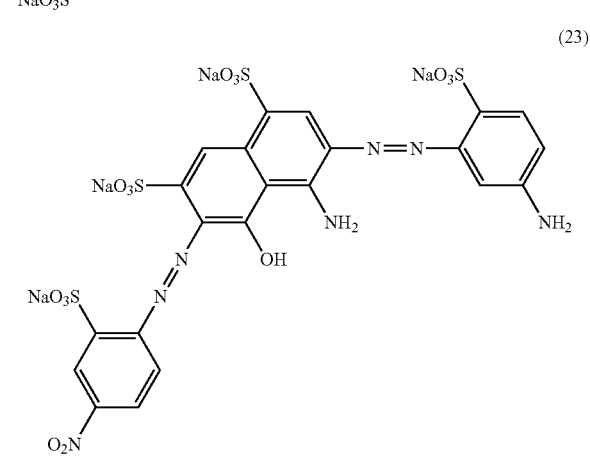
(23)

-continued

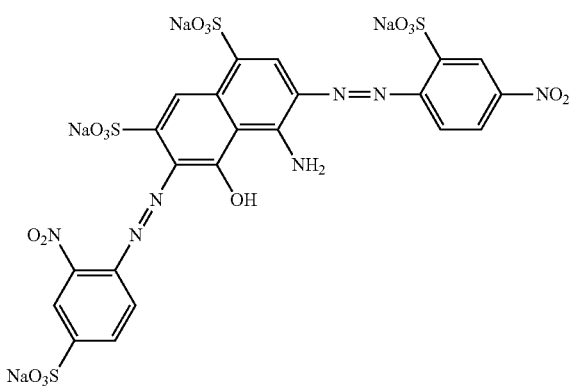

(24)

The invention does not only relate to pure black dyes of general formula (V), but also to mixtures of these dyes.

The black disazo dyes of general formula (V) according to the invention are used for dying cellulose containing materials, paper, cotton, viscose, leather and wool to provide dyed materials with good water fastness and light stability.

All methods well known in the textile and paper industries for dyeing with substantive dyes may be used, in particular for the bulk or surface treatment of sized or unsized paper. The dyes may also be used in the dyeing of yarns and piece goods of cotton, viscose and linen by the exhaustion process from a long liquor or in a continuous process.

The invention furthermore relates to liquid dye preparations comprising at least one black disazo dye of general formula (V). The use of such liquid dye preparations is particularly preferred for paper dyeing. Such stable, liquid, preferably aqueous, concentrated dye preparations may be obtained by using methods well known in the art, preferably by dissolving in suitable solvents. The possibility of preparation of such stable, aqueous, concentrated preparations in the course of dye synthesis itself, without intermediate isolation of the dye, for example after a desalting step by diafiltration of the reaction solution, is of particular advantage.

The invention claims also a process for recording text and images on recording sheets and for dying and printing natural or synthetic fiber materials, nanoporous materials, leather and aluminum by applying thereto a black disazo dyes or a mixture of black disazo dyes according to the invention.

The black disazo dye or the mixture of black disazo dyes of general formula (V) are excellent dyes for the preparation of black recording liquids for ink jet printing and for writing utensils.

In black recording liquids for ink jet printing or for writing utensils, yellow dyes, as for example C.I. Direct Yellow 86, C.I. Direct Yellow 98, C.I. Direct Yellow 132, C.I. Direct Yellow 142, C.I. Direct Yellow 173, C.I. Acid Yellow 23, C.I. Reactive Yellow 3, the hydrolyzed derivative of C.I. Reactive Yellow 3, C.I. Yellow 85, the hydrolyzed derivative of C.I. Yellow 85, C.I. Yellow 95 or the hydrolyzed derivative of C.I. Yellow 95, may be added to the black disazo dyes of general formula (V) according to the invention, in order to obtain a neutral black hue of the printed recording liquids.

The present invention will be illustrated in more detail by the following examples without limiting the scope of the claimed compounds in any way.

EXAMPLES

Example 1a

The intermediate monoazo compound of formula (XVII)

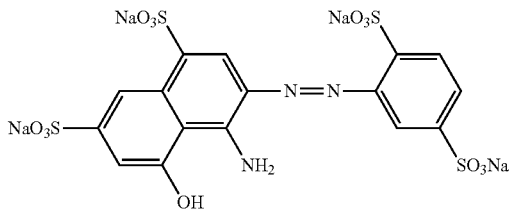

(XVII)

was prepared in the following way:

10 g of aniline-2,5-disulfonic acid (compound of general formula (XII)) were dissolved in 100 g of water and 5.87 g of hydrochloric acid (37%). Then, 1.97 g of sodium nitrite in 8 g of water were added in a molar ratio of 1:1.2 at a temperature of 5° C. to yield a diazotized solution. The excess of sodium nitrite was removed with 0.49 g of sulfamic acid and the diazotized solution was coupled with 8.24 g of the monosodium salt of 4-amino-5-hydroxynaphthalene-1,7-disulfonic acid (K acid, compound of general formula (XIV)) at a value of Ph of 1.5 while maintaining this value of Ph by the addition of sodium hydroxide. The reaction was stirred for 1 hour at a temperature between 0° C. and 5° C. and then warmed up to room temperature. The value of Ph was lowered to 0.5 by the addition of hydrochloric acid. The mixture was then stirred for a further 2 hours at room temperature at this value of Ph. The reaction mixture was finally cooled down to a temperature of 8° C. and then filtered, washed with an ethanol/water mixture (2:1) and dried.

The monoazo dye of formula (XVII) was obtained in a yield of 70%.

Example 1b

The intermediate monoazo compound of formula (XVIII)

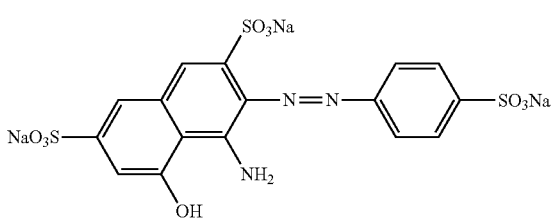

(XVIII)

was prepared in a similar way by using aniline-4-sulfonic acid (compound of general formula (XII)) in place of aniline-2,5-disulfonic acid and 4-amino-5-hydroxynaphthalene-2,7-disulfonic acid (H acid) in place of 4-amino-5-hydroxynaphthalene-1,7-disulfonic acid (K acid) of example 1a.

Example 2

A diazotized solution of aniline-2,5-disulfhonic acid, prepared in a similar way as described in example 1a, was coupled with the monoazo compound of formula (XVII) at a value of pH between 8.5 and 9.0. The dye (2) was salted out by the combined addition of sodium acetate and ethanol. The precipitated dye (2) was filtered off, washed with an ethanol/water mixture (2:1), dialyzed by reverse osmosis, the water was removed by evaporation and dye (2) was dried.

Dye (2) was obtained in a yield of 77%.

Example 3

4-Nitroaniline-2-sulfonic acid was used in place of aniline-2,5-disulfonic acid of example 2.

Dye (3) was obtained in a yield of 78%.

Example 4

The monoazo compound of formula (XVIII) was used in place of the monoazo compound of formula (XVII) of example 2.

Example 5

4-Nitroaniline-2-sulfonic acid was used in place of aniline-2,5-disulfonic acid of example 4.

Example 6

2-Aminobenzonitrile-3,5-disulfonic acid was prepared by reacting 2-aminobenzonitrile with 4 equivalents of sulfamic acid in N-methylpyrrolidone at a temperature of 110° C. for 4 hours.

2-Aminobenzonitrile-3,5-disulfonic acid was used in place of aniline-2,5-disulfonic acid of example 3.

Example 7

4-Nitroaniline-2-sulfonic acid was used in place of 2-aminobenzonitrile-3,5-disulfonic acid of example 6.

Example 8

4-Nitroaniline-2-sulfonic acid was used in place of aniline-2,5-disulfonic acid of example 2.

Example 9

2-Aminonaphthalene-1,5-disulfonic acid was used in place of aniline-2,5-disulfonic acid of example 2.

Example 10

2-Aminonaphthalene-1,5-disulfonic acid was used in place of aniline-2,5-disulfonic acid of example 9.

Example 11

4-Nitroaniline-2-sulfonic acid (compound of general formula (XV)) was used in place of 2-aminonaphthalene-1,5-disulfonic acid of example 10.

Example 12

2,5-Dichloroaniline-4-sulfonic acid was used in place of 2-aminonaphthalene-1,5-disulfonic acid of example 11.

Example 13

Aniline-3,5-dicarboxylic acid was used in place of 2-aminonaphthalene-1,5-disulfonic acid of example 12.

Example 14

Aniline-2,4,6-trisulfonic acid was used in place of 2-aminonaphthalene-1,5-disulfonic acid of example 7.

Example 15

4-Amino-5-hydroxynaphthalene-2,7-disulfonic acid (H acid) was used in place of 4-amino-5-hydroxynaphthalene-1,7-disulphonic acid (K acid) of example 14.

Example 16

4-Amino-5-hydroxynaphthalene-2,7-disulfonic acid (H acid) was used in place of 4-amino-5-hydroxynaphthalene-1,7-disulfonic acid (K acid) of example 3.

Example 17

2-Amino-4-methyl-5-nitrobenzene-1-sulfonic acid was used in place of 4-nitroaniline-2-sulfonic acid of example 3.

Example 18

2-Amino-4-methyl-5-nitrobenzene-1-sulfonic acid was used in place of 4-nitroaniline-2-sulfonic acid of example 7.

Example 19

5-Acetamido-2-aminobenzenesulfonic acid was used in place of aniline-2,5-disulfonic acid of example 3.

Example 20

Aniline-3,5-dicarboxylic acid was used in place of 4-nitroaniline-2-sulfonic acid of example 15.

Example 21

4-Nitroaniline-2-sulfonic acid was used in place of aniline-2,4,6-trisulfonic acid and aniline-2,4,6-trisulfonic was used in place of aniline-3,5-dicarboxylic acid of example 16.

Example 22

2-Nitroaniline-4-sulfonic acid was used in place of 4-nitroaniline-2-sulfonic acid of example 3.

Example 23

Dye (22) was obtained by heating dye (19) for 1 hour at a temperature of 60° C. in an aqueous solution of sodium hydroxide at a value of pH between 9 and 11.

Example 24

2-Nitroaniline-4-sulfonic acid was used in place of 4-nitroaniline-2-sulfonic acid of example 7.

Example of Preparation of a Recording Liquid

The present invention, as far as it relates to recording liquids, is illustrated by the following examples using the disazo dyes (2) to (24) according to the invention and dyes representing the state of the art. For each dye, 100 g of recording liquid were prepared by heating the necessary amount of dye (0.5 g to 1.0 g), ethylene glycol (0.6 g), propylene-1,2-glycol (0.3 g), 1-methyl-2-pyrrolidone (0.3 g), an aqueous solution (50%) of Olin® 10G (available from Arch Chemicals Inc., Norwalk, USA) (0.03 g), Surfinol® 465

(available from Air Products and Chemicals Inc., Allentown, USA) (0.03 g) and a solution of the biocide Mergal® K 10N (available from Riedel-de-Haën, Seelze, Germany) (0.01 g) together with water at a temperature of 50° C. under stirring for approximately 1 hour. The resulting solution was cooled down to a temperature of 20° C., its value of pH was adjusted to 7.5 and the solution was passed through a Millipore® filter of 0.5 µm pore diameter. The dye quantity was adjusted in such a way that the optical density of the printed image was similar for all dyes.

Example of Application of Recording Liquids

Coloured square patches having an approximate density of approximately 1.2 were printed with an ink jet printer Canon PIXMA iP4000 onto the following recording sheets for ink jet printing:

a: HP Printing Paper HP 1122 (uncoated paper),
b: HP Premium Plus (polymer based recording sheet)
and
c: ILFORD Premium Plus Glossy Paper (nanoporous recording sheet)

These colored patches were used for the determination of light stability, dye saturation and resistance against degradation by ozone.

Tests

1. Color Saturation

The color coordinates L*a*b* of the colored square patches were measured with a spectrophotometer Spectrolino® (available from Gretag Macbeth, Regensdorf, Switzerland) in reflection (illuminant $D_{65}$).

The saturation C* is determined from measured color coordinates according to the expression $$C^* = \sqrt{a^{*2} + b^{*2}}$$

Black dyes have a low value of C*.

2. Light Stability

The printed samples were irradiated using a Weather-Ometer® Ci35A (available from Atlas Material Testing Technology, Chicago, USA) with a 6500 W xenon lamp at a temperature of 20° C. and relative humidity of 50% until an illumination of 10 and 20 megalux hours was reached. The density loss was measured with a densitometer Spectrolino®. The percent density loss of initial density gives an indication of the light stability of the dyes on the printed recording sheet.

Light stability was graded in the following way:
A: less than 20% dye density loss
B: 20% to 30% dye density loss
C: 30% to 40% dye density loss
D: more than 40% dye density loss 3. Stability Against Degradation by Ozone The optical density of the colored square patches was measured with a Spectrolino® densitometer. Afterwards, the printed samples were stored for a predetermined time (for example 48 hours) in an ozone chamber, model 903 (available from Satra/Hampden, Great Britain) at a temperature of 30° C., a relative humidity of the air of 50% and an ozone concentration of 1 ppm at a velocity of the circulating, ozone containing air of 13 mm/s. After storage, the samples were re-measured. The density differences of these two measurements, expressed as percent of the initial density, are an indication of the amount of dye loss due to the exposure to ozone.

Stability against degradation by ozone was graded in the following way:
A: less than 20% dye density loss
B: 20% to 30% dye density loss
C: 30% to 40% dye density loss
D: more than 40% dye density loss Results The absorption maxima $\lambda_{max}$ in aqueous solution, the color coordinates on the recording sheet c and the stability against degradation by ozone on the recording sheet c are listed in Table 1.

TABLE 1

| Dye | $\lambda_{max}$ (nm) | L*a*b* | Stability against degradation by ozone | | |
|---|---|---|---|---|---|
| | | | 24 ppmh | 48 ppmh | 96 ppmh |
| 2 | 576 | 18.3/23.8/28.6 | A | A | A |
| 3 | 583 | 15.6/5.4/20.4 | A | A | A |
| 4 | 553 | 9.4/6.8/−10.4 | A | B | |
| 5 | 421/563 | 12.3/19.8/10.2 | B | | |
| 6 | 593 | 11.3/4.1/−19.4 | A | A | B |
| 7 | 596 | 37.6/−10.3/25.9 | A | A | B |
| 8 | 593.5 | 20.5/5.0/−31.0 | A | A | A |
| 9 | 588.5 | 19.6/20.7/32.3 | A | A | A |
| 10 | 582 | 14.2/9.7/−22.8 | A | A | B |
| 11 | 583 | 14.6/−6.4/13.7 | A | A | A |
| 12 | 587 | 12.6/3.3/19.9 | A | A | A |
| 13 | 580.5 | 11.8/5.5/−18.0 | A | A | A |
| 14 | 573 | 14.0/8.0/21.4 | A | A | A |
| 15 | 580.5 | 18.8/5.1/−11.4 | B | | |
| 16 | 605 | 12.8/3.7/−22.4 | A | A | B |
| 17 | 594.5 | 19.4/−0.7/−26.4 | A | A | A |
| 18 | 582.5 | 17.7/6.6/−23.1 | A | A | A |
| 19 | 581.5 | 33.3/−5.5/−23.3 | A | A | B |
| 20 | 581 | 16.3/20.5/−19.1 | C | | |
| 21 | 602 | 19.0/3.5/−33.2 | D | | |
| 22 | 587.5 | 17.3/−6.0/−14.2 | A | A | A |
| 23 | 579.5 | 13.2/−1.4/15.9 | D | | |
| 24 | 598 | 19.3/−12.7/15.0 | A | A | A |
| (I) | 489/634.5 | 8.6/−0.8/−5.8 | A | A | C |
| (II) | 594 | 21.5/5.4/29.5 | A | A | C |
| (III) | 614.5 | 25.2/−0.5/34.3 | A | A | C |
| (IV) | 579/600 | 17.0/23.0/35.5 | D | | |

The results in Table 1 immediately show that the dyes (2), (3), (8), (9), (11), (12), (13), (14), (17), (18), (21) and (23) according to the invention have a considerably better stability against degradation by ozone in comparison to the black dyes (I), (II), (III) and (IV) forming the state of the art.

The stability against degradation by light on the recording sheets a, b and c is listed in Table 2.

TABLE 2

| | Stability against degradation by light | | | | | |
|---|---|---|---|---|---|---|
| | Recording sheet a | | Recording sheet b | | Recording sheet c | |
| Dye | 10 Mluxh | 20 Mluxh | 10 Mluxh | 20 Mluxh | 10 Mluxh | 20 Mluxh |
| 2 | A | B | A | B | A | A |
| 3 | A | B | A | B | A | A |
| 4 | A | B | A | B | A | B |
| 5 | A | B | A | B | A | A |
| 6 | A | C | B | D | B | D |
| 7 | B | C | B | C | B | C |
| 8 | A | B | A | B | A | B |
| 9 | A | C | A | C | A | A |
| 10 | B | C | A | B | A | B |
| 11 | A | B | A | A | A | B |
| 12 | A | B | A | B | A | B |
| 13 | A | B | A | B | A | A |
| 14 | A | A | A | A | A | A |
| 15 | A | B | A | B | B | D |
| 16 | A | B | A | B | A | B |
| 17 | A | B | A | B | A | C |
| 18 | A | B | A | A | A | A |
| 19 | A | C | A | B | A | B |
| 20 | A | B | A | B | A | C |

TABLE 2-continued

| | Stability against degradation by light | | | | | |
|---|---|---|---|---|---|---|
| | Recording sheet a | | Recording sheet b | | Recording sheet c | |
| Dye | 10 Mluxh | 20 Mluxh | 10 Mluxh | 20 Mluxh | 10 Mluxh | 20 Mluxh |
| 21 | B | C | A | C | D | |
| 22 | A | B | A | B | A | B |
| 23 | A | C | A | B | B | D |
| 24 | A | A | A | B | A | C |
| (I) | A | B | A | B | D | |
| (II) | B | D | A | C | A | C |
| (III) | D | D | B | D | B | C |
| (IV) | B | D | B | C | B | C |

The results in Table 2 immediately show that the dyes (2), (3), (4), (5), (8), (9), (11), (12), (13), (14), (15), (16), (18) and (22) according to the invention have a considerably better stability against degradation by light in comparison to the black dyes (I), (II), (III) and (IV) forming the state of the art.

With regard to the stability against degradation by both ozone and light, the dyes (2), (3), (9), (13), (14) and (18) have a considerably better stability in comparison to the black dyes (I), (II), (III) and (IV) forming the state of the art.

The foregoing description of various and preferred embodiments of the present invention has been provided for purposes of illustration only, and it is understood that numerous modifications, variations and alterations may be made without departing from the scope and spirit of the invention as set forth in the following claims.

The invention claimed is:

1. Black disazo dyes of general formula (V)

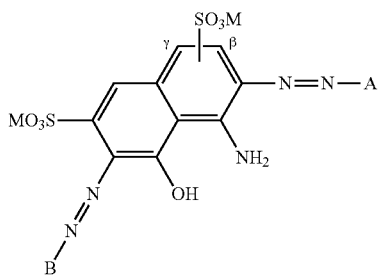

(V)

wherein

M represents a hydrogen atom, a sodium atom, a potassium atom, a lithium atom, an ammonium cation or an aliphatic ammonium cation with 4 identical substituents having from 1 to 4 carbon atoms, A is a moiety of formula (VI)

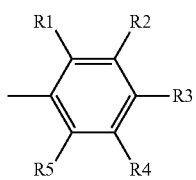

(VI)

wherein $R_1$ represents a hydrogen atom, a halogen atom, a sulfonic acid group or a nitro group;

$R_2$ represents a hydrogen atom, a carboxylic acid group, a sulfonic acid group, a hydroxy group or a nitro group;

$R_3$ represents a hydrogen atom, a halogen atom, a nitrile group, a carboxylic acid group, a sulfonic acid group, a nitro group, an alkyl group having 1 to 4 carbon atoms, an alkyl group having 1 to 4 carbon atoms substituted by 1 to 3 halogen atoms, an ester group having 1 to 4 carbon atoms, an alkoxyl group having 1 to 4 carbon atoms, an unsubstituted or substituted heterocyclic group, a sulfonamide group, a sulfonyl group, a sulfoester group having 1 to 4 carbon atoms or an alkylamido group having 1 to 4 carbon atoms;

$R_4$ represents a hydrogen atom, a halogen atom, a carboxylic acid group, a sulfonic acid group, a nitro group, an alkyl group having 1 to 4 carbon atoms, an alkoxyl group having 1 to 4 carbon atoms, a sulfonamide group, a sulfonyl group, a sulfoester group having 1 to 4 carbon atoms or an alkylamido group having 1 to 4 carbon atoms;

$R_5$ represents a hydrogen atom, a halogen atom, a nitrile group, a sulfonic acid group, a nitro group, a hydroxy group, an alkyl group having 1 to 4 carbon atoms or an alkylamido group having 1 to 4 carbon atoms B is a moiety of formula (VIII)

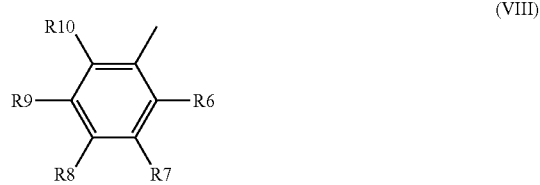

(VIII)

wherein $R_6$ represents a hydrogen atom, a halogen atom, a sulfonic acid group or a nitro group;

$R_7$ represents a hydrogen atom, a carboxylic acid group, a sulfonic acid group, a hydroxy group or a nitro group;

$R_8$ represents a hydrogen atom, a halogen atom, a nitrile group, a carboxylic acid group, a sulfonic acid group, a nitro group, an alkyl group having 1 to 4 carbon atoms, an alkyl group having 1 to 4 carbon atoms substituted by 1 to 3 halogen atoms, an ester group having 1 to 4 carbon atoms, an alkoxyl group having 1 to 4 carbon atoms, an unsubstituted or substituted heterocyclic group, a sulfonamide group, a sulfonyl group, a sulfoester group having 1 to 4 carbon atoms or an alkylamido group having 1 to 4 carbon atoms;

$R_9$ represents a hydrogen atom, a halogen atom, a carboxylic acid group, a sulfonic acid group, a nitro group, an amino group, an alkyl group having 1 to 4 carbon atoms, an alkoxyl group having 1 to4 carbon atoms, a sulfonamide group, a sulfonyl group, a sulfoester group having 1 to 4 carbon atoms or an alkylamido group having 1 to 4 carbon atoms;

$R_{10}$ represents a hydrogen atom, a halogen atom, a nitrile group, a sulfonic acid group, a nitro group, a hydroxy group, an alkyl group having 1 to 4 carbon atoms or an alkylamido group having 1 to 4 carbon atoms;

and

B has at least one sulfonic acid group.

2. Black disazo dyes of general formula (V) according to claim 1, wherein

M is as defined in claim 1, $R_1$ represents a hydrogen atom, a halogen atom or a sulfonic acid group;

$R_2$ represents a hydrogen atom or a carboxylic acid group;

$R_3$ represents a hydrogen atom, a nitro group or a sulfonic acid group;

$R_4$ represents a hydrogen atom, a halogen atom, a sulfonic acid group, a carboxylic acid group, a nitro group, an amino group or an alkylamido group having 1 to 4 carbon atoms;

$R_5$ represents a hydrogen atom, a nitrile group or a sulfonic acid group;

$R_6$ represents a hydrogen atom, a nitro group or a sulfonic acid group;

$R_7$ represents a hydrogen atom or a carboxylic acid group;

$R_8$ represents a hydrogen atom, a sulfonic acid group or a nitro group;

$R_9$ represents a hydrogen atom, a sulfonic acid group, a carboxylic acid group or an alkyl group having 1 to 4 carbon atoms;

$R_{10}$ represents a hydrogen atom or a sulfonic acid group.

3. Black disazo dyes of general formula (V) according to claim 2, wherein $R_2$ is as defined in claim 2, M represents a hydrogen atom, a sodium atom, a potassium atom, a lithium atom, an ammonium cation or an aliphatic ammonium cation with 4 identical substituents having from 1 to 4 carbon atoms, $R_1$ represents a hydrogen atom or a sulfonic acid group;

$R_3$ represents a hydrogen atom or a sulfonic acid group;

$R_4$ represents a hydrogen atom, a sulfonic acid group or a carboxylic acid group;

$R_5$ represents a hydrogen atom or a sulfonic acid group;

$R_6$ represents a hydrogen atom or a sulfonic acid group;

$R_7$ represents a hydrogen atom;

$R_8$ represents a hydrogen atom or a nitro group;

$R_9$ represents a hydrogen atom, a sulfonic acid group or an alkyl group having 1 to 4 carbon atoms;

$R_{10}$ represents a hydrogen atom.

4. Black disazo dyes of general formula (V) according to any of claims 1 to 3, wherein the sulfo group is in position γ.

5. Method of preparation of the black disazo dyes of general formula (V) according to claim 1, wherein, in a first step, an amine of general formula (XII)

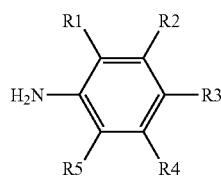

(XII)

wherein $R_1$, $R_2$, $R_3$, $R_4$, and $R_5$ are as defined in claim 1, is diazotized in an aqueous inorganic acid medium at a temperature between −5° C. and 15° C. and coupled with the compound of formula (XIV)

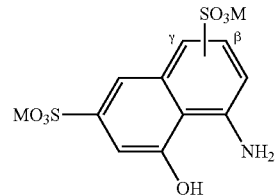

(XIV)

at an acidic to weakly acidic value of pH situated between 1 and 4 and, in a second step, an amine of general formula (XV)

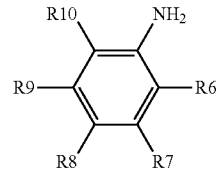

(XV)

wherein $R_6$, $R_7$, $R_8$, $R_9$ and $R_{10}$ are as defined in claim 1, is diazotized in an inorganic acid medium at a temperature between −5° C. and 15° C. and coupled with the reaction product of step 1 at a weakly basic to basic value of pH situated between 8 and 10.

6. Process for recording text and images on recording sheets and for dyeing and printing natural or synthetic fibre materials, nanoporous materials, leather and aluminum by applying thereto a black disazo dye or a mixture of black disazo dyes according to claim 1.

7. Liquid dye preparations containing at least one black disazo dye or a mixture of black disazo dyes according to claim 1.

8. Recording liquids for ink jet printing and for writing utensils containing at least one black disazo dye or a mixture of black disazo dyes according to claim 1.

9. Recording liquids for ink jet printing and for writing utensils containing in addition to the at least one black disazo dye or a mixture of black disazo dyes according to claim 1, one or more other dyes.

10. Recording liquids for ink jet printing and for writing utensils according to claim 9, wherein the additional dye or dyes are yellow dyes.

11. Recording liquids for ink jet printing and for writing utensils according to claim 10, wherein the yellow dye or yellow dyes are selected from the group consisting of C.I. Direct Yellow 86, C.I. Direct Yellow 98, C.I. Direct Yellow 132, C.I. Direct Yellow 142, C.I. Direct Yellow 173, C.I. Acid Yellow 23, C.I. Reactive Yellow 3, the hydrolyzed derivative of C.I. Reactive Yellow 3, C.I. Yellow 85, the hydrolyzed derivative of C.I. Yellow 85, C.I. Yellow 95 and the hydrolyzed derivative of C.I. Yellow 95.

* * * * *